United States Patent
Jang et al.

(10) Patent No.: US 10,320,855 B2
(45) Date of Patent: *Jun. 11, 2019

(54) METHOD AND APPARATUS FOR CONTROLLING OPERATIONS OF DEVICES BASED ON INFORMATION REGARDING POWER CONSUMPTION OF THE DEVICES

(71) Applicant: SAMSUNG ELECTRONICS CO., LTD., Suwon-si (KR)

(72) Inventors: Jae-hwi Jang, Yongin-si (KR); Hyun-soo Park, Seoul (KR); Young-jin Park, Bucheon-si (KR); Jong-hyun Shin, Suwon-si (KR); Kyu-suk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 370 days.

This patent is subject to a terminal disclaimer.

(21) Appl. No.: 15/016,758

(22) Filed: Feb. 5, 2016

(65) Prior Publication Data

US 2016/0156679 A1    Jun. 2, 2016

Related U.S. Application Data

(63) Continuation of application No. 13/013,404, filed on Jan. 25, 2011, now Pat. No. 9,258,131.

(Continued)

(30) Foreign Application Priority Data

Mar. 15, 2010    (KR) .................. 10-2010-0022951

(51) Int. Cl.
   *G05B 11/01*    (2006.01)
   *H04L 29/06*    (2006.01)
   (Continued)

(52) U.S. Cl.
   CPC ........ *H04L 65/1073* (2013.01); *G05B 19/042* (2013.01); *G06Q 10/06* (2013.01);
   (Continued)

(58) Field of Classification Search
   CPC .................. H04L 67/125; Y02D 50/40; G05B 2219/2639
   See application file for complete search history.

(56) References Cited

U.S. PATENT DOCUMENTS

| 6,456,893 B1 | 9/2002 | Nakanishi |
| 7,110,832 B2 * | 9/2006 | Ghent ..................... D06F 33/02 700/16 |

(Continued)

FOREIGN PATENT DOCUMENTS

| EP | 1217475 A2 | 6/2002 |
| EP | 1589403 A2 | 10/2005 |

(Continued)

OTHER PUBLICATIONS

Communication dated Dec. 11, 2013 issued by the European Patent Office in counterpart European Patent Application No. 11151607.6.

(Continued)

*Primary Examiner* — Laura M Menz
(74) *Attorney, Agent, or Firm* — Sughrue Mion, PLLC

(57) ABSTRACT

A method of controlling operations of a participating controlled device in a network that includes a control device and the participating controlled device, the method including: receiving operation limiting information from the participating controlled device, the operation limiting information including combinations of allowed operations from among a plurality of operations that the participating controlled device is capable of performing, and power consumption levels that are relative amounts of power consumption of the combinations of allowed operations; setting a power con- (Continued)

sumption level corresponding to the participating controlled device, from among the power consumption levels, based on information regarding time-based price and the operation limiting information; and controlling the operations of the participating controlled device based on the set power consumption level.

13 Claims, 7 Drawing Sheets

Related U.S. Application Data

(60) Provisional application No. 61/297,943, filed on Jan. 25, 2010.

(51) Int. Cl.
  *G06Q 10/06* (2012.01)
  *H04L 12/12* (2006.01)
  *H04L 29/08* (2006.01)
  *G05B 19/042* (2006.01)
  *H04L 12/28* (2006.01)

(52) U.S. Cl.
  CPC .......... *H04L 12/12* (2013.01); *H04L 12/2803* (2013.01); *H04L 67/125* (2013.01); *G05B 2219/2639* (2013.01); *Y02D 50/40* (2018.01); *Y04S 40/18* (2018.05)

(56) References Cited

U.S. PATENT DOCUMENTS

| | | | | |
|---|---|---|---|---|
| 7,127,832 | B2* | 10/2006 | Park | D06F 58/28 34/562 |
| 8,868,243 | B2* | 10/2014 | Kim | G05B 15/02 700/275 |
| 9,258,131 | B2* | 2/2016 | Jang | H04L 12/12 |
| 2004/0068889 | A1* | 4/2004 | Park | D06F 58/24 34/446 |
| 2004/0095237 | A1 | 5/2004 | Chen et al. | |
| 2005/0016012 | A1* | 1/2005 | Yang | D06F 58/10 34/486 |
| 2007/0129851 | A1* | 6/2007 | Rossi | H02J 3/14 700/295 |
| 2009/0049709 | A1* | 2/2009 | Doh | D06F 58/28 34/524 |
| 2009/0195349 | A1* | 8/2009 | Frader-Thompson | G01D 4/002 340/3.1 |
| 2009/0234511 | A1* | 9/2009 | Ouchi | H02J 3/14 700/291 |
| 2010/0070099 | A1* | 3/2010 | Watson | G06Q 50/06 700/295 |
| 2011/0184582 | A1* | 7/2011 | Jang | H04L 12/12 700/296 |
| 2012/0089263 | A1* | 4/2012 | Park | H02J 13/001 700/291 |
| 2012/0192450 | A1* | 8/2012 | Kim | D06F 25/00 34/427 |
| 2012/0197441 | A1* | 8/2012 | Kim | G05B 15/02 700/275 |
| 2012/0215370 | A1* | 8/2012 | Seo | H04L 12/12 700/296 |
| 2012/0271475 | A1* | 10/2012 | Wang | H02J 3/14 700/295 |
| 2013/0227150 | A1* | 8/2013 | Ahn | H02J 13/0079 709/227 |
| 2013/0274938 | A1* | 10/2013 | Ahn | H04L 12/12 700/291 |
| 2016/0156679 | A1* | 6/2016 | Jang | H04L 12/12 700/296 |

FOREIGN PATENT DOCUMENTS

| | | | | |
|---|---|---|---|---|
| EP | 2354890 | A1 * | 8/2011 | ............ H04L 12/12 |
| EP | 2354890 | A1 * | 8/2011 | ............ H04L 12/12 |
| JP | 992121 | A | 4/1997 | |
| JP | 10154004 | A | 6/1998 | |
| JP | 2007510968 | A | 4/2007 | |
| KR | 1020080010695 | A | 1/2008 | |
| KR | 1020090002328 | A | 1/2009 | |
| WO | 2006/083416 | A2 | 8/2006 | |

OTHER PUBLICATIONS

Communication, dated Feb. 13, 2013, issued by the European Patent Office in counterpart European Application No. 11151607.6.
Extended European Search Report issued in corresponding European application No. 11151607.6 dated Jun. 28, 2011.
UPnP Forum: "UPnP Device Architecture 1.1". Contributing Members of the UPnP Forum. Oct. 15, 2008. pp. 1-129. http://www.upnp.org/specs/arch/UPnP-arch-DeviceArchitecture-v1.1.pdf.
Communication dated Jun. 28, 2011 issued in corresponding European application No. 11151607.6.
Office Action issued in parent U.S. Appl. No. 13/013,404 dated Oct. 4, 2013.
Final Office Action issued in parent U.S. Appl. No. 13/013,404 dated Jan. 30, 2014.
Office Action issued in parent U.S. Appl. No. 13/013,404 dated Nov. 28, 2014.
Final Office Action issued in parent U.S. Appl. No. 13/013,404 dated Mar. 19, 2015.
Notice of Allowance issued in parent U.S. Appl. No. 13/013,404 dated Oct. 1, 2015.
Notice of Allowance dated Oct. 10, 2016, by the Korean Intellectual Property Office in counterpart Korean Application No. 10-2010-0022951.

* cited by examiner

FIG. 2

| POWER CONSUMPTION LEVEL | AMOUNT OF POWER CONSUMPTION | MINIMUM OPERATING TIME | USER PREFERENCE | COMBINATIONS OF ALLOWED OPERATIONS |
|---|---|---|---|---|
| 1 | 1.13 KWh | 200 MIN | 3 | FULL WASHING/RINSING + FULL SPIN-DRYING + FULL HEAT-DRYING |
| 2 | 0.14 KWh | 120 MIN | 3 | FULL WASHING/RINSING + FULL SPIN-DRYING |
| 3 | 0.11 KWh | 60 MIN | 3 | FULL WASHING/RINSING + SIMPLE SPIN-DRYING (+ PAUSING) |
| 4 | 0.019 KWh | 13 MIN | 3 | STANDING BY |

METHOD AND APPARATUS FOR CONTROLLING OPERATIONS OF DEVICES BASED ON INFORMATION REGARDING POWER CONSUMPTION OF THE DEVICES

CROSS-REFERENCE TO RELATED PATENT APPLICATIONS

This is a continuation of U.S. application Ser. No. 13/013,404 filed Jan. 25, 2011, which claims the benefit of U.S. Provisional Application No. 61/297,943, filed on Jan. 25, 2010 in the U.S. Patent and Trademark Office, and claims priority from Korean Patent Application No. 10-2010-0022951, filed on Mar. 15, 2010 in the Korean Intellectual Property Office, the disclosures of which are incorporated herein in their entirety by reference.

BACKGROUND

1. Field

Apparatuses and methods consistent with exemplary embodiments relate to controlling the operations of devices, and more particularly, to controlling the operations of devices based on information regarding power consumption of the devices.

2. Description of the Related Art

A smart grid is a new concept of a grid, in which information and communication technology is grafted onto a unidirectional energy supply system including power generation, power transmission/distribution, and sales so that real-time information can be bi-directionally exchanged between a power supplier and a consumer, thereby optimizing energy efficiency.

The smart grid uses a concept of demand response (DR) where the consumer uses power aside from his/her general consumption in response to a price, a monetary reward, or directions of a power generation company. Accordingly, the power supplier may induce or suppress electricity consumption during a desired time period, and the customer may consume electricity at a low price.

In a related art, a control device that received information about a time-based price may turn on or off home appliances connected to the control device with or without wires in order to control power consumption in such a smart grid.

SUMMARY

One or more exemplary embodiments provide a method and apparatus for controlling the operations of devices based on information regarding power consumption thereof.

According to an aspect of an exemplary embodiment, there is provided a method of controlling operations of a participating controlled device in a network that includes a control device and at least one participating controlled device, the method including: receiving operation limiting information from the participating controlled device, the operation limiting information including combinations of allowed operations from among a plurality of operations that the participating controlled device is capable of performing, and power consumption levels that are relative amounts of power consumption of the combinations of allowed operations; setting a power consumption level corresponding to the participating controlled device, based on information regarding time-based price and the operation limiting information; and controlling the operations of the participating controlled device based on the set power consumption level.

The operation limiting information may further include information on at least one of amounts of power consumption to perform the combinations of allowed operations, minimum operating times to perform the combinations of allowed operations, and users' preferences for the combinations of allowed operations.

The method may further include registering a non-participating controlled device that is not included in the network with the network.

The registering the non-participating controlled device with the network may include: receiving a join request frame for requesting to join the network from the non-participating controlled device; and transmitting a join response frame approving the request to join the network to the non-participating controlled device.

The registering the non-participating controlled device with the network may further include: receiving device information regarding the non-participating controlled device from the non-participating controlled device; outputting a user interface via which a response as to whether the non-participating controlled device is to be registered is received, based on the device information; receiving the response as to whether the non-participating controlled device is to be registered, via the user interface; and selectively transmitting a registration informing frame indicating that the non-participating controlled device has been registered to the non-participating controlled device, based on the received response.

The receiving the join request frame may include receiving the join request frame from the non-participating controlled device to which an identifier of the network is input or that receives the identifier of the network.

The receiving the join request frame may include receiving the join request frame from the non-participating controlled device that transmits the join request frame to a network having a strongest network signal from among the network that includes the at least one participating controlled device and at least one other network.

The receiving the join request frame may include: receiving the join request frame from the non-participating controlled device that transmits the join request frame to a network that transmits a registration standby signal to the non-participating controlled device from among the network that includes the at least one participating controlled device and at least one other network, and the registration standby signal indicates that the network stands by to receive the join request frame.

The method may further include: checking whether a power cut-off has occurred suddenly before the control device is powered on, when the control device is powered on; reading or receiving, from at least one of the control device, an external server, and the at least one participating controlled device, information on at least one of the operation limiting information, an identifier of the network, identifiers of the at least one participating controlled device, times when the at least one participating controlled device initially begin to operate, final power consumption levels of the at least one participating controlled device, actual amounts of power consumption of the at least one participating controlled device before the power cut-off has occurred suddenly, an accumulated amount of power consumption of the at least one participating controlled device, priorities allocated to the at least one participating controlled device, current operating states of the at least one participating controlled device, and information regarding time-based price, when if it is determined that the power cut-off has occurred suddenly; resetting the power consumption level corresponding to the participating controlled device, based on the read or received information and the information regarding time-based price; and controlling the operations of the participating controlled device based on the reset power consumption level.

The at least one piece of information may be received in an encrypted form.

The method may further include setting a maximum rate of power that the at least one participating controlled device are capable of consuming for a predetermined amount of time, wherein the setting the power consumption levels may be performed based on the maximum power rate.

The controlling the operations of the participating controlled device may include: controlling a participating controlled device having a highest priority from among the at least one participating controlled device to operate according to a power consumption level at which the participating controlled device having the highest priority consumes a largest amount of power from among power consumption levels of the participating controlled device having the highest priority; and controlling participating controlled devices having a same priority from among the at least one participating controlled device to operate according to a same power consumption level from among power consumption levels of the participating controlled devices having the same priority.

According to an aspect of another exemplary embodiment, there is provided an apparatus for controlling operations of a participating controlled device in a network that includes a control device and at least one participating controlled device, the apparatus including: a receiver which receives operation limiting information from the participating controlled device, the operation limiting information including combinations of allowed operations from among a plurality of operations that the participating controlled device is capable of performing, and power consumption levels that are relative amounts of power consumption of the combinations of allowed operations; a power consumption level setting unit which sets a power consumption level corresponding to the participating controlled device, based on information regarding time-based price and the operation limiting information; and an operation control unit which controls the operations of the participating controlled device based on the set power consumption level.

The apparatus may further include: a registration unit which registers a non-participating controlled device that is not included in the network with the network, if the receiver receives a join request frame requesting to join the network from the non-participating controlled device; and a transmission unit which transmits a join response frame approving the request to join the network to the non-participating controlled device according to an instruction from the registration unit.

If the receiver receives device information regarding the non-participating controlled device from the non-participating controlled device, the apparatus may further include: an interface manager which outputs a user interface via which a response as to whether the non-participating controlled device is to be registered is received, based on the device information.

If the response as to whether the non-participating controlled device is to be registered is received via the user interface, the transmission unit may selectively transmit, to the non-participating controlled device, a registration informing frame indicating that the non-participating controlled device has been registered, based on the received response.

According to an aspect of another exemplary embodiment, there is provided a computer readable recording medium having recorded thereon a computer program for executing a method of controlling operations of a participating controlled device in a network that includes a control device and at least one participating controlled device, the method including: receiving operation limiting information from the participating controlled device, where the operation limiting information includes combinations of allowed operations from among a plurality of operations that the participating controlled device is capable of performing, and power consumption levels that are relative amounts of power consumption of the combinations of allowed operations; setting a power consumption level corresponding to the participating controlled device, based on information regarding time-based price and the operation limiting information; and controlling the operations of the participating controlled device based on the set power consumption level.

According to an aspect of another exemplary embodiment, there is provided a method of controlling operations of a participating controlled device in a network that includes a control device and the participating controlled device, the method including: transmitting, from the participating controlled device, operation limiting information including combinations of allowed operations from among operations that the participating controlled device is capable of performing, and power consumption levels that are relative amounts of power consumption of the combinations of allowed operations; and controlling the operations of the participating controlled device based on a set power consumption level, from among the power consumption levels, that is set by the control device based on information regarding time-based price and the operation limiting information.

BRIEF DESCRIPTION OF THE DRAWINGS

The above and/or other aspects will become more apparent by describing in detail exemplary embodiments with reference to the attached drawings in which:

FIG. 2 is a table illustrating a structure of operation limiting information according to an exemplary embodiment;

DETAILED DESCRIPTION OF EXEMPLARY EMBODIMENTS

Hereinafter, exemplary embodiments will be described in detail with reference to the accompanying drawings. Expressions such as "at least one of," when preceding a list of elements, modify the entire list of elements and do not modify the individual elements of the list.

Figure 1:
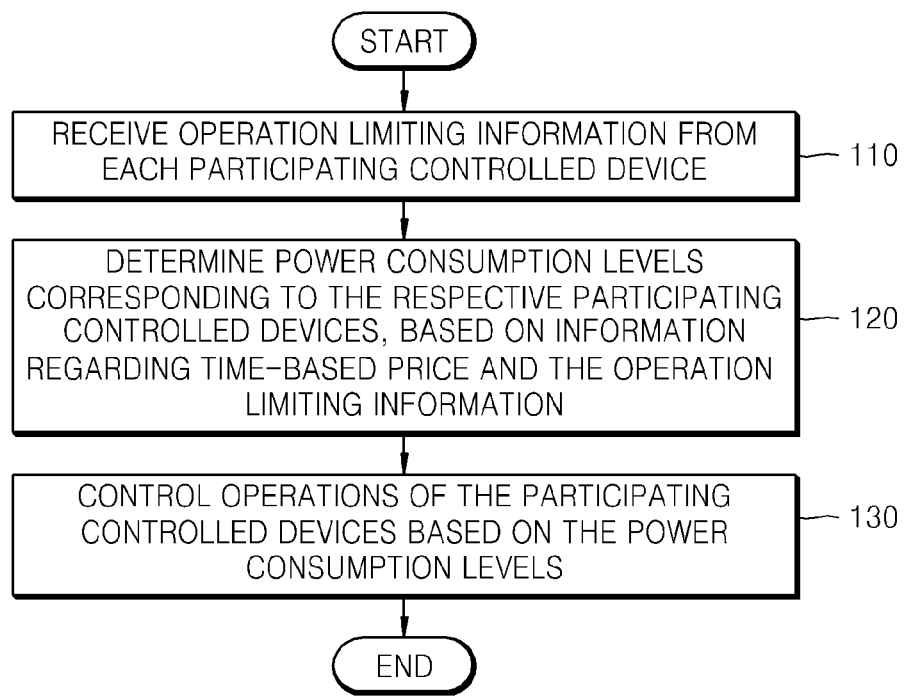
FIG. 1 is a flowchart illustrating a method of controlling operations of devices included in a network, according to an exemplary embodiment.

FIG. 1 is a flowchart illustrating a method of controlling operations of devices included in a network, according to an exemplary embodiment. In the current exemplary embodiment, it is assumed that the network includes a control device and a plurality of participating controlled devices, and the control device controls the operations of the participating controlled devices in the network.

Referring to FIG. 1, in operation 110, operation limiting information is received from each of the participating controlled devices. The operation limiting information includes information regarding combinations of allowed operations from among operations that may be performed by the participating controlled devices, and power consumption levels that are relative amounts of power consumed by the respective combinations of allowed operations.

The operation limiting information may further include information on at least one of the amounts of power consumed by the respective combinations of allowed operations, minimum operating times needed to perform the combinations of allowed operations, and users' preferences for the combinations of allowed operations. The operation limiting information may be stored in the participating controlled devices when the participating controlled devices were manufactured. According to an exemplary embodiment, the participating controlled devices are capable of performing a bi-directional communication with the control device in a wired or wireless manner, and are constructed in such a way that their allowed operations are limited according to a power consumption level. According to another exemplary embodiment, each of the participating controlled devices can measure an actual amount of power consumption thereof.

In being capable of performing a bi-directional communication with the control device, the participating controlled devices can inform the control device of the actual amounts of power consumption thereof and the control device can inform the participating controlled devices of power consumption levels corresponding to the actual amounts of power consumption so that the control device may control the operations of the participating controlled devices by using a smart grid. In this case, the participating controlled devices themselves may measure the actual amounts of power consumption thereof as described above, or an additional device may be provided in the participating controlled devices so as to measure the actual amounts of power consumption via the additional device.

Examples of the participating controlled devices include various devices, e.g., a washing machine, an air conditioner, a refrigerator, a flashlight, a hair drier, a mobile phone charger, a computer, a notebook computer, etc., which may communicate with an in-home control device.

The control device is capable of performing a bi-directional communication with the participating controlled devices and controlling the participating controlled devices. Examples of the control device includes various devices, e.g., a Wallpad, a set-up box, a computer, a notebook computer, a mobile device, a media center, etc., which can perform a bi-directional communication with the participating controlled devices and can control the participating controlled devices.

The network to which the control device and the participating controlled devices belong may be a wired network, such as a Pipe Line Communication (PLC) network, an Ethernet network, etc., or a wireless network, such as a Bluetooth network, a Wi-Fi network, a ZigBee network, etc.

A structure of operation limiting information according to an exemplary embodiment will now be described with reference to FIG. 2.

FIG. 2 is a table illustrating a structure of operation limiting information according to an exemplary embodiment. In the current exemplary embodiment, it is assumed that a participating controlled device is a washing machine, though it is understood that another exemplary embodiment is not limited thereto. Referring to FIG. 2, the operation limiting information includes a power consumption level field 210, a power consumption amount field 220, a minimum operating time field 230, a preference field 240, and an allowed operation combination field 250.

In the power consumption level field 210, power consumption levels of relative amounts of power consumption corresponding to combinations of allowed operations of the washing machine, which are listed in the allowed operation combination field 250, are listed. Referring to the power consumption level field 210 in FIG. 2, the power consumption levels range from 1 to 4 according to the relative amounts of power consumption. In this case, the greater a relative amount of power consumption, the lower a power consumption level, though another exemplary embodiment is not limited thereto.

For example, in the power consumption level field 210 of FIG. 2, the power consumption level 1 corresponds to a maximum amount of power consumption.

In the power consumption amount field 220, the amounts of power consumption corresponding to the first to fourth combinations of allowed operations are listed.

Referring to FIG. 2, the amounts of power consumption corresponding to the first to fourth combinations of allowed operations are 1.13 kWh, 0.14 kWh, 0.11 kWh, and 0.019 kWh, respectively. In this case, the amounts of power consumption listed in the power consumption amount field 220 may be initial values recorded by a manufacturer of the washing machine during the manufacture of the washing machine.

According to another exemplary embodiment, amounts of power consumption corresponding to the first to fourth combinations of allowed operations listed in the allowed operation combination field 250 may be measured by the washing machine itself or another device and may be recorded in the power consumption amount field 220.

In the minimum operating time field 230, minimum operating times to perform the respective first to fourth combinations of allowed operations are listed.

In the current exemplary embodiment, the minimum operating times to perform the respective first to fourth combinations of allowed operations are 200 minutes, 120 minutes, 60 minutes, and 13 minutes.

In the preference field 240, a power consumption level to which users prefer from among the power consumption levels 1 to 4 listed in the power consumption level field 210 is listed.

However, if the washing machine is a brand-new product, then it may be difficult for the manufacturer to know the users' preference and thus the power consumption level 3 may be recorded as an initial value in the preference field 240, as illustrated in FIG. 2.

A user may replace a preferred power consumption level recorded in the preference field 240 (e.g., by the manufacturer) with another power consumption level that the user prefers.

For example, if the manufacturer has recorded the power consumption level 3 as a preferred power consumption level in the preference field 240, then the user may replace the recorded preferred power consumption level with the power consumption level 1.

In the allowed operation combination field 250, the first to fourth combinations of allowed operations, which are combinations of allowed operations from among the operations that the washing machine may perform, are listed.

Referring to FIG. 2, the allowed operation combination field 250 includes the first to fourth combinations of allowed operations.

The first combination of allowed operations may be a combination of full washing/rinsing, full spin-drying, and full heat-drying from among a plurality of operations that the mashing machine may perform. Here, full washing/rinsing refers to strong washing/rinsing, full spin-drying refers to strong spin-drying, and full heat-drying refers to strong heat-drying.

The first combination of allowed operations includes more allowed operations than the other combinations of allowed operations. Thus, the amount of power consumption and an operating time to perform the first combination of allowed operations are greater than those to perform the other combinations of allowed operations.

The second combination of allowed operations is a combination of full washing/rinsing and full spin-drying.

The third combination of allowed operations is a combination of full washing/rinsing and simple spin-drying. The third combination of allowed operations may further include pausing.

Here, simple spin-drying refers to weak spin-drying, and pausing refers to temporarily stopping a full washing/rinsing or a simple spin-drying that is being performed.

The fourth combination of allowed operations includes standing by, in which the washing machine stands by after performing of a current operation is completed and any other subsequent operations from among the operations included in the first to third combinations of allowed operations are not performed. In this case, it is assumed that it takes a minimum of 13 minutes to complete the performing of the current operation, and thus, a minimum operating time to perform the fourth combination of allowed operations is set to 13 minutes. However, another exemplary embodiment is not limited thereto, and the minimum operating time may be set to be longer than or shorter than 13 minutes.

Furthermore, it is understood that the operation limiting information according to another exemplary embodiment is not limited to the first to fourth combinations of allowed operations listed in the allowed operation combination field 250 of FIG. 2. For example, according to another exemplary embodiment, the allowed operation combination field 250 may further include a combination of allowed operations that are performed to turn off the washing machine.

Referring back to FIG. 1, in operation 120, power consumption levels corresponding to the respective participating controlled devices are determined based on information regarding time-based price and the operation limiting information.

The information regarding time-based price specifies a plurality of time periods and power rates allocated to the respective time periods when different power rates are allocated to the time periods. For example, if the amount of power consumption in a time band from 2:00 p.m. to 4:00 p.m. is greater than in the other times periods, then a power rate allocated to the time band from 2:00 p.m. to 4:00 p.m. may be more expensive than those allocated to the other time periods and this fact may be reflected in the information regarding time-based price. In the information regarding time-based price, the power rates allocated to the respective time periods may be presented in the form of a continuous graph or may be presented discretely.

The information regarding time-based price may be read from a storage device of the control device or may be periodically received from the outside, e.g., a power supply company. For example, the information regarding time-based price may be received in units of hours, days, or months.

The information regarding time-based price may be input directly to the control device via an input device included in the control device.

In operation 130, the operations of the participating controlled devices are controlled based on the determined power consumption levels.

More specifically, a participating controlled device having high priority from among the participating controlled devices is controlled to operate according to a power consumption level corresponding to a maximum amount of power consumption from among a plurality of power consumption levels of the participating controlled device having high priority. Also, participating controlled devices having the same priority from among the participating controlled devices are controlled to operate according to the same power consumption level from among power consumption levels of the participating controlled devices having the same priority.

For example, if a washing machine having the operation limiting information of FIG. 2 has higher priority than other participating controlled devices, then the washing machine may perform all of full washing/rinsing, full spin-drying, and full heat-drying according to the power consumption level 1. However, in this case, a user may instruct the washing machine to selectively perform at least one from among full washing/rinsing, full spin-drying, and full heat-drying.

As described above, according to the current exemplary embodiment, the operations of the participating controlled devices are controlled based on power consumption levels thereof. Thus, it is possible to more effectively control power consumption of participating controlled devices than in a related art method of controlling an amount of power consumption simply by turning on or off participating controlled devices.

Figure 3:
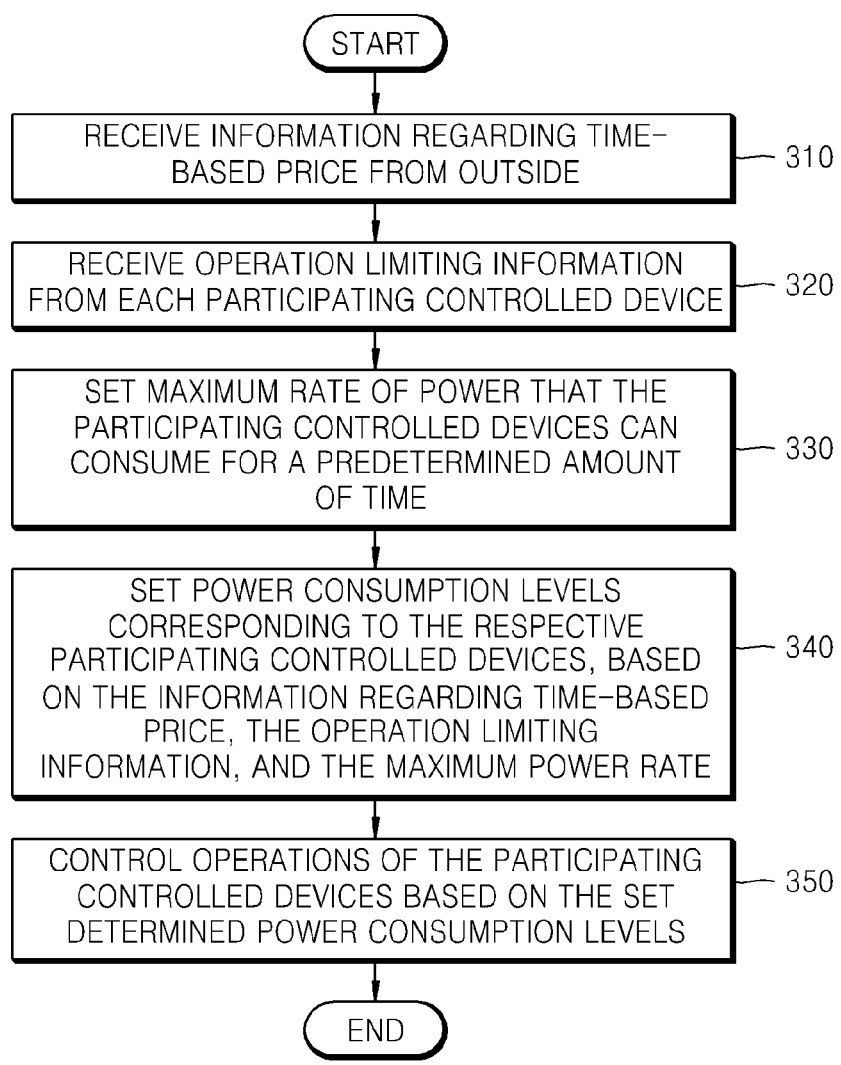
FIG. 3 is a flowchart illustrating a method of controlling operations of devices included in a network, according to another exemplary embodiment.

FIG. 3 is a flowchart illustrating a method of controlling the operations of devices included in a network, according to an exemplary embodiment. Referring to FIG. 3, in operation 310, information regarding time-based price is received from the outside.

However, it is understood that another exemplary embodiment is not limited thereto. For example, if a control device uses information regarding time-based price stored in a storage unit thereof, operation 310 may be omitted.

In operation 320, operation limiting information is received from each participating controlled device.

In operation 330, a maximum rate of power that the participating controlled devices can consume for a predetermined amount of time is determined.

For example, if a user desires to pay three hundred thousand won for a power rate per one month, the maximum power rate may be set to three hundred thousand won per month, though another exemplary embodiment is not limited thereto and the maximum power rate may be determined in units of days or years.

In operation 340, power consumption levels corresponding to the respective participating controlled devices are determined based on the information regarding time-based price, the operation limiting information, and the maximum power rate.

A method of determining a power consumption level of a participating controlled device in operation 340, according to an exemplary embodiment, will now be described.

First, if a user sets the maximum power rate to ten thousand won per day, then the control device calculates a maximum amount of power consumption pd that is allowed per day, which corresponds to the maximum power rate, based on the information regarding time-based price.

Second, amounts of power consumption at a power consumption level at which participating controlled devices belonging to a network consume power more than at the other power consumption levels are checked. For example, amounts of power consumption of the participating controlled devices at the power consumption level 1 of FIG. 2 are checked.

Third, the checked amounts of power consumption are arranged in descending power order, based on priorities allocated to the respective participating controlled devices.

Fourth, an accumulated amount of power consumption is calculated by adding the arranged amounts of power consumption together. If the accumulated amount of power consumption is less than or equal to the maximum amount of power consumption pd, then all the operations of the participating controlled devices are controlled according to the power consumption level 1. Otherwise, if the accumulated amount of power consumption is greater than the maximum amount of power consumption pd, power consumption levels of the respective participating controlled devices are determined based on the priorities allocated to the respective participating controlled devices.

For example, if participating controlled devices A, B, C, D, and E are present in a network and an accumulated amount of power consumption of the participating controlled devices A, B, C, and D is less than or equal to the maximum amount of power consumption Pd when an amount of power consumption of the participating controlled device E is excluded, then the control device may determine a power consumption level that allows the participating controlled device E to be turned off to be a current consumption level of the participating controlled device E from among power consumption levels of the participating controlled device E.

However, if priorities allocated to the respective participating controlled devices A, B, and C are higher than those allocated to the participating controlled devices D and E and the priorities allocated to the participating controlled devices D and E are the same, then the control device may change current power consumption levels of the participating controlled devices D and E to be the power consumption level 2 or 3, so that an accumulated amount of power consumption of the participating controlled devices A, B, C, D, and E is less than or equal to the maximum amount of power consumption Pd, without having to turn off the participating controlled device E.

In another exemplary embodiment, current operating states of the participating controlled devices may be considered when power consumption levels of the respective participating controlled devices are set. In this case, a highest priority may be allocated to a participating controlled device that is currently performing an operation from among the participating controlled operations. For example, if a washing machine is currently performing a washing operation, a highest priority may be allocated to the washing machine. In another exemplary embodiment, the control device may transmit a query inquiring whether a current operating state or power consumption level may be changed on the participating controlled devices, may receive feedback information regarding the query from the participating controlled devices, and may change the power consumption levels of the participating controlled devices based on the feedback information. Here, the feedback information may include the current operating states of the respective participating controlled devices, information as to whether the power consumption levels of the respective participating controlled devices may be changed, amounts of power consumption corresponding to the respective power consumption levels, minimum operating times corresponding to the power consumption levels, results of diagnosing hardware states of the respective participating controlled devices by the participating controlled devices themselves, respectively.

Referring back to FIG. 3, in operation 350, operations of the participating controlled devices are controlled based on the determined power consumption levels.

As described above, a control device may control operations of participating controlled devices when the control device and the participating controlled devices are present in a network. Furthermore, the control device may register a non-participating controlled device as a new participating controlled device with the network and may control not only an operation of the new participating controlled device but also the operations of the existing participating controlled devices.

A method of registering a non-participating controlled device with a network according to an exemplary embodiment will now be described with reference to FIG. 4.

Figure 4:
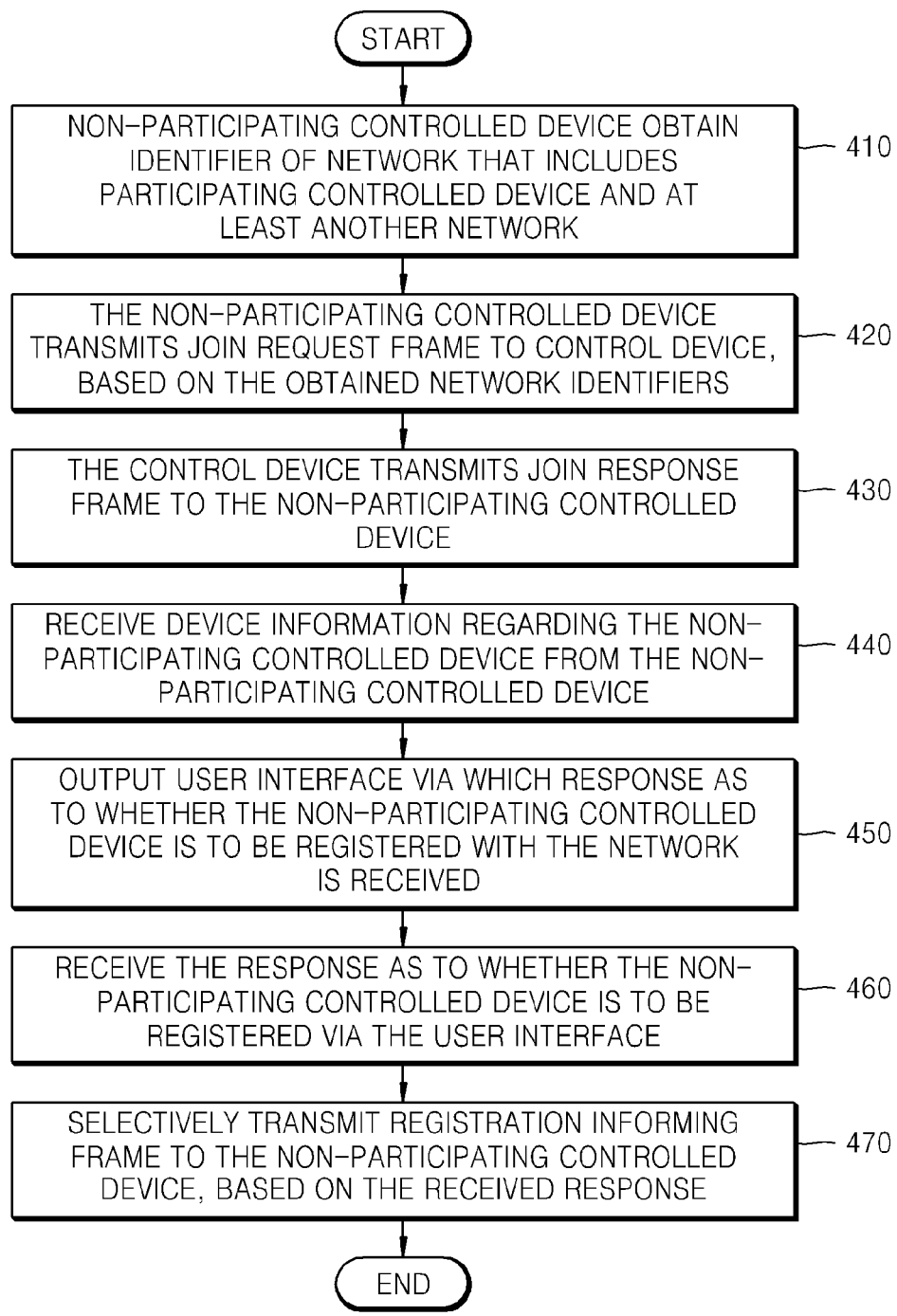
FIG. 4 is a flowchart illustrating a method of registering a non-participating controlled device with a network, according to an exemplary embodiment.

FIG. 4 is a flowchart illustrating a method of registering a non-participating controlled device with a network, according to an exemplary embodiment. Referring to FIG. 4, in operation 410, a non-participating controlled device obtains a network identifier of the network that includes participating controlled devices and a network identifier of at least another network.

Specifically, in operation 410, if the non-participating controlled device is powered on or a button of the non-participating controlled device is pressed, then the non-participating controlled device may search for the network that includes the participating controlled devices and at least another network so as to obtain the network identifiers thereof.

If the non-participating controlled device has already been registered with another network and a button of the non-participating controlled device is pressed, then the non-participating controlled device may cancel the registration and search for other networks.

In another exemplary embodiment, the non-participating controlled device may obtain only the network identifier of the network that includes the participating controlled devices, from among network identifiers of networks.

For example, the non-participating controlled device may receive the network identifier of the network, which includes the participating controlled devices, via an input device included in the non-participating controlled device itself or from a detachable storage device that stores the network identifier and that is inserted into the non-participating controlled device. Also, the non-participating controlled device may read the network identifier of the network, which includes the participating controlled devices, from a storage device that includes a Radio-Frequency Identification (RFID) module, via an RFID reader included in the non-participating controlled device itself.

By obtaining network identifiers, the non-participating controlled device may join a network that requires a network identifier thereof to be used to establish a communication between devices belonging to the network. For example, a ZigBee network allows only devices having the same Personal Area Network Identifier (PANID) to communicate with one another.

In operation 420, the non-participating controlled device transmits a join request frame for requesting to join a network to a control device, based on the obtained network identifiers.

If in operation 410, the non-participating controlled device obtained only the network identifier of the network that includes the participating controlled devices, then the non-participating controlled device may transmit the join request frame to the control device, based on the obtained network identifier.

If in operation 410, the non-participating controlled device obtained not only the network identifier of the network that includes the participating controlled devices but also network identifiers of the other networks, then the non-participating controlled device may determine which network identifier is related to the network that includes the participating controlled devices from among the obtained network identifiers.

Methods of allowing the non-participating controlled device to determine which network identifier is related to the network that includes the participating controlled devices from among the obtained network identifiers, according to one or more exemplary embodiments, will now be described. Here, it is assumed that the network that includes the participating controlled devices is a preferred network.

In a first exemplary method, the non-participating controlled device determines a network identifier of a network having a strongest network signal from among detected networks to be a network identifier of a preferred network. This method is based on a fact that the strength of a network signal transmitted from a control device included in a preferred in-home network of a user is greater than those of network signals from control devices included in networks of other home networks. However, if the strength of a network signal from a control device in a network of another house is stronger than that of the network signal from the control device in the preferred in-home network, then the non-participating controlled device may transmit the join request frame to the network of the other house.

In a second exemplary method, in order to detect a network identifier of a preferred network, the non-participating controlled device displays network identifiers of detected networks on a display unit included in the non-participating controlled device itself, and a user selects an identifier of a preferred network from among the displayed network identifiers In a third exemplary method, the control device transmits a registration standby signal indicating that the control device itself is on stand by in order to receive the join request frame to the non-participating controlled device and the non-participating controlled device detects a network identifier of a network to which this control device belongs, as a network identifier of a preferred network.

Although in the third exemplary method, the control device may transmit the registration standby signal to the non-participating controlled device, the non-participating controlled device may more precisely detect a network identifier of a preferred network without having to include additional devices.

If the non-participating controlled device detects a network identifier of a preferred network according to one of the above exemplary methods, then the non-participating controlled device may transmit the join request frame to the preferred network by using the detected network identifier.

If the preferred network is a ZigBee network, only the control device in the ZigBee network may receive a signal from the outside. Thus, the join request frame that the non-participating controlled device transmits to the preferred network is first transmitted to the control device.

In operation 430, the control device transmits a join response frame approving the request to join a network to the non-participating controlled device.

If the non-participating controlled device receives the join response frame from the control device, the non-participating controlled device may join the preferred network.

In the current exemplary embodiment, even if the non-participating controlled device joins the preferred network, an operation of determining whether the non-participating controlled device is to be registered with the preferred network is further performed. However, it is understood that another exemplary embodiment is not limited thereto. For example, in another exemplary embodiment, once the non-participating controlled device joins the preferred network, the non-participating controlled device may be registered directly with the preferred network without performing this operation.

In operation 440, device information regarding the non-participating controlled device is received from the non-participating controlled device. The device information may include information, for example, regarding at least one of a product model, product name, a manufacturing company, etc., of the non-participating controlled device.

In operation 450, a user interface via which a response as to whether the non-participating controlled device is to be registered with the network is received from a user is output.

The user may check the information regarding at least one of the product model, product name, manufacturing company, etc., of the non-participating controlled device via the user interface, and may determine whether the non-participating controlled device is to be registered with the preferred network based on this information. The user interface may be a graphical user interface.

In operation 460, the response as to whether the non-participating controlled device is to be registered with the network is received from the user via the user interface.

In operation 470, a registration informing frame indicating that the non-participating controlled device has been registered with the network is selectively transmitted to the non-participating controlled device, based on the received response.

More specifically, if the user inputs a response approving registration of non-participating controlled device with the preferred network to the user interface, then the registration informing frame is transmitted to the non-participating controlled device. However, if the user inputs a response rejecting registration of the non-participating controlled device with the preferred network to the user interface, then a rejection informing frame is transmitted to the non-participating controlled device.

If the non-participating controlled device receives the rejection informing frame or does not receive the registration informing frame within a predetermined amount of time after the join response frame was received from the control device, then the non-participating controlled device may transmit the join request frame to a network other than the preferred network.

If the non-participating controlled device has been registered with a network other than the preferred network, then the non-participating controlled device may transmit a registration canceling frame for requesting the registration to be canceled to the other network, and may transmit the join request frame to the preferred network.

Until now, it is assumed that the control device or the participating controlled devices are continuously powered on. However, in actuality, power may be cut off suddenly, for example, due to a power failure. In order to allow the control device to effectively control amounts of power consumption of the participating controlled devices, a method to minimize influences of a power cut-off that prevents the control device to control the operations of the participating controlled devices may be provided.

To this end, the power consumption levels of the participating controlled devices may be reset in consideration of an environmental change between before and after the power cut-off occurs. This will now be described in detail with reference to FIGS. 5 and 6.

Figure 5:
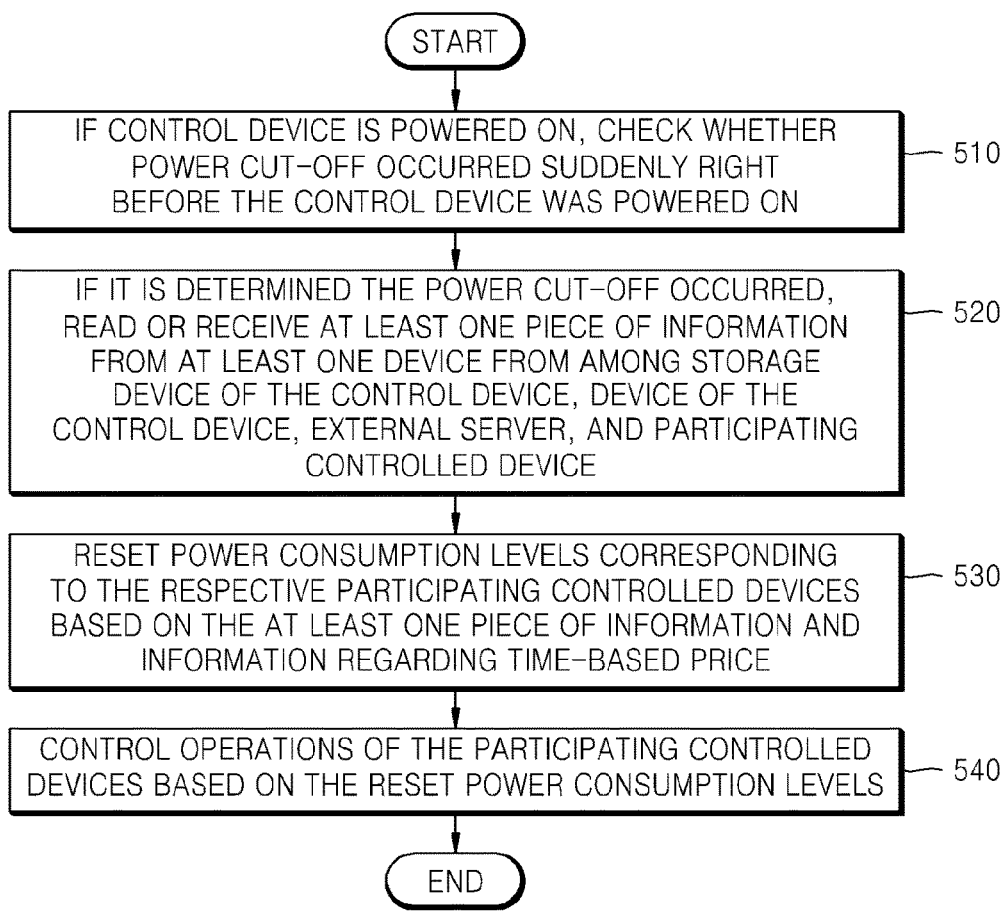
FIG. 5 is a flowchart illustrating a method of allowing a control device to reset power consumption levels of respective participating controlled devices after a power cut-off occurs suddenly, according to an exemplary embodiment.

FIG. 5 is a flowchart illustrating a method of allowing a control device to reset power consumption levels corresponding to respective participating controlled devices after a power cut-off occurs suddenly, according to an exemplary embodiment.

Referring to FIG. 5, in operation 510, if the control device is powered on, it is checked whether a power cut-off occurred suddenly right before the control device was powered on.

If it is determined in operation 510 that a power cut-off occurred, then the time when the power cut-off occurred may be checked and may be stored together with the time when the control device was powered on again after the power cut-off.

In operation 520, if it is determined in operation 510 that the power cut-off occurred, then information on at least one of operation limiting information, a network identifier, identifiers of the respective participating controlled devices, times when the participating controlled devices initially began to operate, respectively, final power consumption levels of the respective participating controlled devices, actual amounts of power consumption of the respective participating controlled devices before the power cut-off occurred, an accumulated amount of power consumption, i.e., the sum of the actual amounts of power consumption of the respective participating controlled devices, priorities allocated to the participating controlled devices, respectively, current operating states of the respective participating controlled devices, and information regarding time-based price is read or received from at least one of a storage device of the control device, an external server, and the participating controlled devices.

In an exemplary embodiment, the control device searches the storage device thereof for the at least one piece of information, and searches the external server for the at least one piece of information. If the at least one piece of information is not searched for, or discovered, from both the storage device of the control device and the external server, then the control device may request the participating controlled devices to provide the at least one piece of information.

As described above, the control device may restore information that was not transmitted thereto or that was lost due to the power cut-off and may obtain information to reset the power consumption levels of the respective participating controlled devices.

In order to perform operation 520, there may be a precondition that the control device periodically store information, such as the at least one piece of information, in the storage device thereof, the external server, or the like.

The control device may receive information in an encrypted form from the external server or the participating controlled devices so as to prevent a third party from hacking the information during transmission of the information from the external server or the participating controlled devices. In another exemplary embodiment, only portions of information received from the external server or the participating controlled devices may be encrypted.

In another exemplary embodiment, a join request frame and a join response frame may be exchanged between the control device and the participating controlled devices so that the participating controlled devices may be registered with a network that includes the control device, before the control device receives information from the participating controlled devices. However, in the current exemplary embodiment, since the participating controlled devices are present in the network that includes the control device, a user may not perform an operation of determining whether the non-participating controlled devices are to be registered with the network.

In operation 530, the power consumption levels corresponding to the respective participating controlled devices are reset based on the at least one piece of information and the information regarding time-based price.

For example, if the control device is powered on again a long time after a power cut-off occurred suddenly and the information regarding time-based price is updated, then the power consumption levels of the respective participating controlled devices are to be reset.

In operation 540, after the power consumption levels of the respective participating controlled devices are reset, the control device controls the operations of the participating controlled devices based on the reset power consumption levels.

Figure 6:
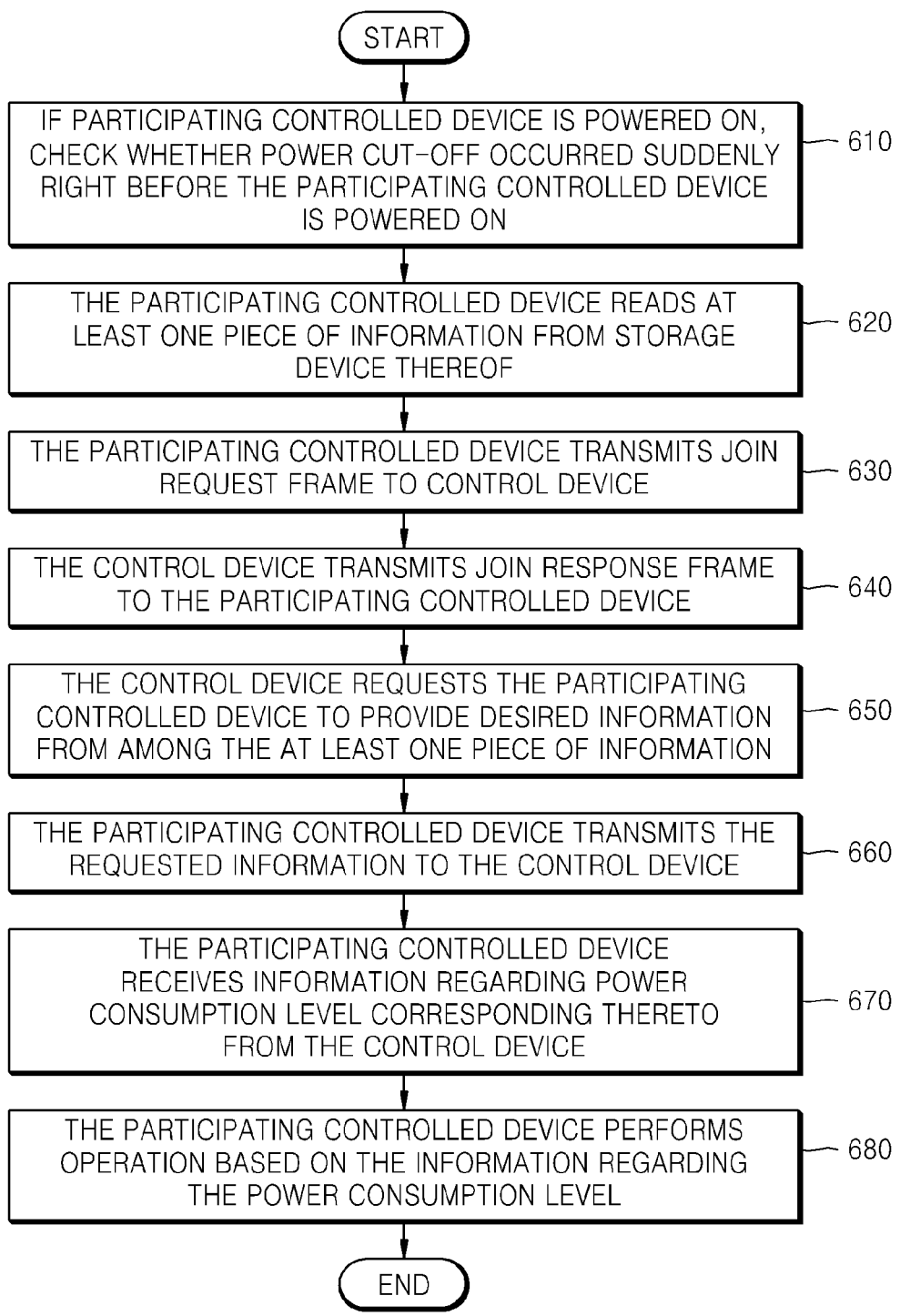
FIG. 6 is a flowchart illustrating a method of operating participating controlled devices according to power consumption levels thereof that are reset after a power cut-off occurred suddenly, according to an exemplary embodiment.

FIG. 6 is a flowchart illustrating a method of operating participating controlled devices according to power consumption levels thereof that are reset after a power cut-off occurred suddenly, according to an exemplary embodiment. Referring to FIG. 6, in operation 610, if a participating controlled device is powered on, it is checked whether a power cut-off occurred suddenly right before the participating controlled device is powered on.

If it is determined in operation 610 that the power cut-off occurred suddenly, the time when the power cut-off occurred may be checked and information regarding the time when the power cut-off occurred and the time when the participating controlled device is powered on again may be stored.

In operation 620, the participating controlled device reads from a storage device thereof at least one of information on a network identifier, times when the participating controlled devices initially began to operate, respectively, final power consumption levels of the respective participating controlled devices, actual amounts of power consumption of the respective participating controlled devices before the power cut-off occurred, and an accumulated amount of power consumption, i.e., the sum of the actual amounts of power consumption of the respective participating controlled devices.

In order to perform operation 620, there may exist a condition that the participating controlled device periodically stores information, such as the at least one piece of information, in the storage device thereof.

The storage device may be non-volatile memory, such as read-only memory (ROM), flash memory, or a hard disc, etc.

In operation 630, the participating controlled device transmits a join request frame requesting to join a network to a control device.

In operation 640, the control device transmits a join response frame approving the request to join the network to the participating controlled device.

In operation 650, the control device requests the participating controlled device to provide desired information from among the at least one piece of information.

In operation 660, the participating controlled device transmits the requested information to the control device.

In operation 670, the participating controlled device receives information regarding a power consumption level corresponding thereto from the control device.

In operation 680, the participating controlled device performs an operation based on the information regarding the power consumption level.

Figure 7:
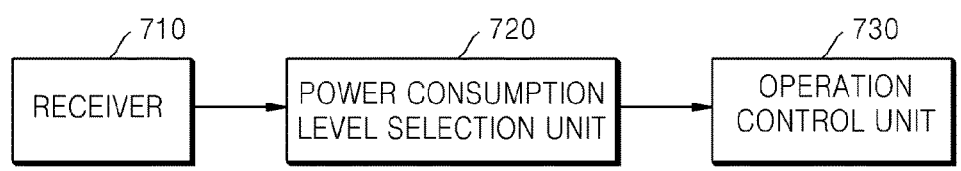
FIG. 7 is a block diagram of an apparatus for controlling operations of devices, according to an exemplary embodiment.

FIG. 7 is a block diagram of an apparatus for controlling operations of devices, according to an exemplary embodiment. Referring to FIG. 7, the apparatus includes a receiver 710, a power consumption level selection unit 720, and an operation control unit 730. The apparatus of FIG. 7 may be the control device described above or may be included in the control device described above.

The receiver 710 receives operation limiting information from each of the participating controlled devices. The operation limiting information includes combinations of allowed operations from among operations that the participating controlled devices may perform, and power consumption levels that indicate relative amounts of power consumption of the combinations of allowed operations.

The power consumption level selection unit 720 sets power consumption levels corresponding to the respective participating controlled devices, based on information regarding time-based price and the operation limiting information.

The operation control unit 730 controls the operations of the participating controlled devices based on the set power consumption levels.

Figure 8:
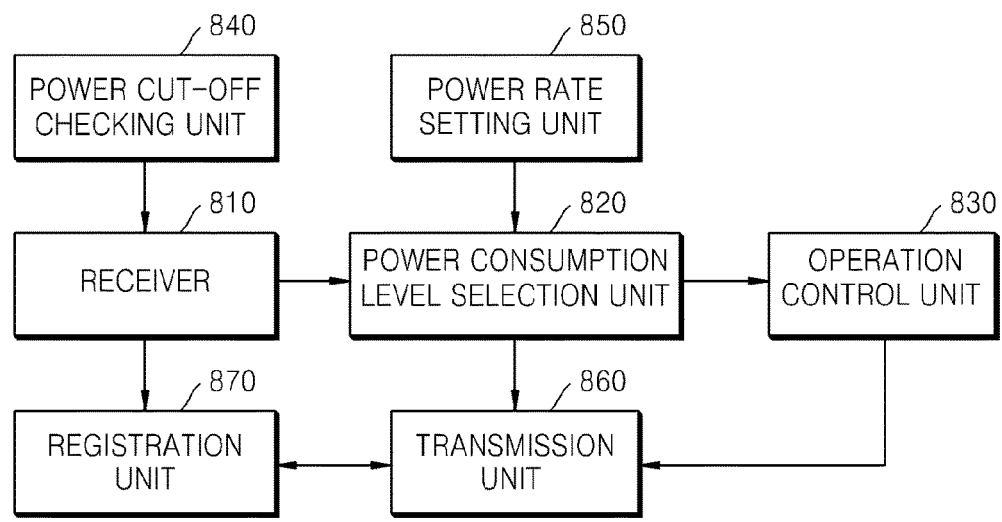
FIG. 8 is a block diagram of an apparatus for controlling operations of devices, according to another exemplary embodiment.

FIG. 8 is a block diagram of an apparatus for controlling operations of devices, according to another exemplary embodiment. Referring to FIG. 8, the apparatus includes a receiver 810, a power consumption level selection unit 820, an operation control unit 830, a power cut-off checking unit 840, a power rate setting unit 850, a transmission unit 860, and a registration unit 870.

The operations of the receiver 810, the power consumption level selection unit 820, and the operation control unit 830 are the same as or similar to those of the receiver 710, the power consumption level selection unit 720, and the operation control unit 730 of FIG. 7, respectively.

If the apparatus of FIG. 8 is powered on, then the power cut-off checking unit 840 checks whether a power cut-off occurred suddenly right before the apparatus of FIG. 8 is powered on.

The power rate setting unit 850 sets a maximum rate of power that the participating controlled devices may consume for a predetermined amount of time. Specifically, a user may set the maximum power rate by using the power rate setting unit 850.

If the power rate setting unit 850 sets the maximum power rate, then the power consumption level selection unit 820 sets power consumption levels corresponding to the respective participating controlled devices, based on information regarding time-based price, operation limiting information, and the maximum power rate.

If the receiver 810 receives a join request frame for requesting to join a network from one of the non-participating controlled devices, the transmission unit 860 transmits a join response frame approving the request to join the network to the non-participating controlled device.

The operation control unit 830 may control operations of the participating controlled devices by instructing the transmission unit 860 to transmit the power consumption levels corresponding to the respective participating controlled devices to the participating controlled devices, respectively.

The registration unit 870 registers a non-participating controlled device that is not included in a preferred network with the preferred network. Also, the registration unit 870 may instruct the transmission unit 860 to transmit the join response frame to the non-participating controlled device.

In another exemplary embodiment, if a response approving registration of the non-participating controlled device with the network is received from a user via a user interface, then the registration unit 870 may register the non-participating controlled device with the network.

In an exemplary embodiment, the apparatus of FIG. 8 may further include an interface manager (not shown) for providing the user interface.

One or more of the above exemplary embodiments may be embodied as a computer program. The computer program may be stored in a computer readable recording medium, and executed using a general digital computer. Examples of the computer readable medium include a magnetic recording medium (a ROM, a floppy disc, a hard disc, etc.), and an optical recording medium (a CD-ROM, a DVD, etc.). Moreover, one or more units of the control device or the controlled device can include a processor or microprocessor executing a computer program stored in a computer-readable medium While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method of operating by a device in a network, the method comprising:
   transmitting operation limiting information comprising a plurality of combinations of allowable operations from among operations that the device is capable of performing, a plurality of amounts of power consumption to perform the plurality of combinations of allowable operations, a plurality of minimum operating times to perform the plurality of combinations of allowable operations, and a plurality of power consumption levels that represent relative amounts of power consumption of the plurality of combinations of allowable operations respectively; and receiving, from a control device, a control signal generated based on a power consumption level which is set in accordance with information regarding time-based price and the operation limiting information, performing, by the control device, one or more of the operations in accordance with the received control signal, wherein the performing comprises:
performing a first combination of the allowable operations in accordance with a first control signal, as the received control signal, based on a first power consumption level among the plurality of power consumption levels, and performing a second combination of the allowable operations in accordance with a second control signal, as the received control signal, based on a second power consumption level among the plurality of power consumption levels.

2. The method of claim 1, further comprising registering with the network if the device is not included in the network, wherein the registering with the network comprises:
transmitting, to the control device, a join request frame requesting to join the network; and
receiving, from the control device, a join response frame approving the requesting to join the network.

3. The method of claim 2, wherein the registering with the network further comprises:
transmitting, to the control device, device information regarding the device; and
receiving a registration informing frame indicating that the device has been registered, wherein the registration informing frame is generated based on the device information.

4. The method of claim 2, wherein the device transmits the join request frame if the device receives an input of an identifier of the network or the identifier of the network.

5. The method of claim 2, wherein the transmitting the join request frame comprises transmitting the join request frame to a network having a strongest network signal from among the network and at least one other network.

6. The method of claim 2, wherein the transmitting the join request frame comprises transmitting the join request frame to a network that transmits a registration standby signal to the device if it is non-participating from among the network which is participating, and the registration standby signal indicates that the network stands by to receive the join request frame.

7. An apparatus for operating in a network, the apparatus comprising:
a processor configured to perform:
transmitting operation limiting information comprising a plurality of combinations of allowable operations from among operations that the apparatus is capable of performing, a plurality of amounts of power consumption to perform the plurality of combinations of allowable operations, a plurality of minimum operating times to perform the plurality of combinations of allowable operations, and a plurality of power consumption levels that represent relative amounts of power consumption of the plurality of combinations of allowable operations respectively, and receiving, from a control device, a control signal generated based on a power consumption level which is set in accordance with information regarding time-based price and the operation limiting information, performing one or more of the operations in accordance with the received control signal, wherein the processor is further configured to perform the one or more of the operations by;
performing a first combination of the allowable operations in accordance with a first control signal, as the received control signal, based on a first power consumption level among the plurality of power consumption levels, and performing a second combination of the allowable operations in accordance with a second control signal, as the received control signal, based on a second power consumption level among the plurality of power consumption levels.

8. The apparatus of claim 7, the processor is further configured to perform registering with the network if the apparatus is not included in the network,
wherein the registering with the network comprises:
transmitting, to the control device, a join request frame requesting to join the network; and
receiving, from the control device, a join response frame approving the requesting to join the network.

9. The apparatus of claim 8, wherein the registering with the network further comprises:
transmitting, to the control device, device information regarding the apparatus;
receiving a registration informing frame indicating that the apparatus has been registered, wherein the registration informing frame is generated based on the device information.

10. The apparatus of claim 8, wherein the processor is configured to transmit the join request frame if the processor receives an input of an identifier of the network or the identifier of the network.

11. The apparatus of claim 8, wherein the transmitting the join request frame comprises transmitting the join request frame to a network having a strongest network signal from among the network that includes the at least one apparatus and at least one other network.

12. The apparatus of claim 8, wherein the transmitting the join request frame comprises transmitting the join request frame to a network that transmits a registration standby signal to the apparatus if it is non-participating from among the network that includes the at least one apparatus which is participating, and the registration standby signal indicates that the network stands by to receive the join request frame.

13. A non-transitory computer readable recording medium having recorded thereon a computer program for executing the method of claim 1.

* * * * *